US007346664B2

(12) United States Patent
Wong et al.

(10) Patent No.: US 7,346,664 B2
(45) Date of Patent: Mar. 18, 2008

(54) TRANSPARENT FILE MIGRATION USING NAMESPACE REPLICATION

(75) Inventors: Thomas K. Wong, Pleasanton, CA (US); Panagiotis Tsirigotis, Sunnyvale, CA (US); Anand Iyengar, Mountain View, CA (US); Rajeev Chawla, Union City, CA (US)

(73) Assignee: Neopath Networks, Inc., San Jose, CA (US)

( * ) Notice: Subject to any disclaimer, the term of this patent is extended or adjusted under 35 U.S.C. 154(b) by 621 days.

(21) Appl. No.: 10/831,376

(22) Filed: Apr. 23, 2004

(65) Prior Publication Data

US 2004/0267830 A1    Dec. 30, 2004

Related U.S. Application Data

(60) Provisional application No. 60/465,579, filed on Apr. 24, 2003, provisional application No. 60/465,578, filed on Apr. 24, 2003.

(51) Int. Cl.
*G06F 13/00* (2006.01)

(52) U.S. Cl. ............... 709/214; 709/215; 709/226; 707/200

(58) Field of Classification Search ............ 709/213, 709/214, 215, 217, 223, 226; 707/104.1, 707/200
See application file for complete search history.

(56) References Cited

U.S. PATENT DOCUMENTS

| | | | |
|---|---|---|---|
| 5,689,701 A | 11/1997 | Ault et al. | |
| 5,774,715 A | 6/1998 | Madany et al. | |
| 5,890,169 A | 3/1999 | Wong et al. | |
| 5,933,825 A | 8/1999 | McClaughry et al. | |
| 6,101,508 A | 8/2000 | Wolff | |
| 6,353,837 B1 | 3/2002 | Blumenau | |
| 6,389,427 B1 | 5/2002 | Faulkner | |
| 6,442,548 B1 | 8/2002 | Balabine et al. | |
| 6,606,690 B2 | 8/2003 | Padovano | |

(Continued)

OTHER PUBLICATIONS

Notification of Transmittal of the International Search Report and the Written Opinion, PCT/US04/12841, Oct. 13, 2004, 9 pages.

(Continued)

*Primary Examiner*—Viet D. Vu
(74) *Attorney, Agent, or Firm*—Beyer Weaver LLP

(57) ABSTRACT

A NAS switch provides file migrations in a NAS storage network that are transparent to the clients. A source file server exports an original NAS file handles indicative of object locations on the source file server to the NAS switch. The NAS switch modifies the original NAS file handles to an internal file system and maps the original NAS file handles to a switch file handles independent of location. The NAS switch exports the switch file handles to a client. The client looks-up objects and makes NAS requests to the source file server using switch file handles. The NAS switch performs file migration by first replicating the namespace containing data to be migrated from source file server to a destination file server. Separately, the NAS replicates data which is a relatively longer process than the namespace replication. During data replication, namespace access requests for objects are directed to the replicated namespace. After data replication, file object requests for migrated objects are redirected to the destination file server in a process that is transparent to the client.

42 Claims, 10 Drawing Sheets

U.S. PATENT DOCUMENTS

| | | |
|---|---|---|
| 6,697,846 B1 | 2/2004 | Soltis |
| 6,938,039 B1* | 8/2005 | Bober et al. .................... 707/8 |
| 6,985,956 B2 | 1/2006 | Luke et al. |
| 6,996,714 B1 | 2/2006 | Halasz et al. |
| 7,054,927 B2 | 5/2006 | Ulrich et al. |
| 7,089,293 B2 | 8/2006 | Grosner et al. |
| 7,120,666 B2 | 10/2006 | McCanne et al. |
| 2002/0013832 A1 | 1/2002 | Hubbard |
| 2002/0111929 A1 | 8/2002 | Pudipeddi et al. |
| 2002/0120763 A1 | 8/2002 | Miloushev et al. |
| 2002/0133491 A1 | 9/2002 | Sim et al. |
| 2003/0037061 A1* | 2/2003 | Sastri et al. ............ 707/103 R |
| 2003/0154236 A1 | 8/2003 | Dar et al. |
| 2003/0195903 A1 | 10/2003 | Manley et al. |
| 2003/0204670 A1 | 10/2003 | Holt et al. |
| 2004/0010714 A1 | 1/2004 | Stewart |
| 2004/0024963 A1 | 2/2004 | Talagala et al. |
| 2004/0054748 A1 | 3/2004 | Ackaouy et al. |
| 2004/0078465 A1 | 4/2004 | Coates et al. |
| 2004/0117438 A1 | 6/2004 | Considine et al. |
| 2004/0139167 A1* | 7/2004 | Edsall et al. ................. 709/212 |
| 2005/0033932 A1 | 2/2005 | Pudipeddi et al. |
| 2005/0055402 A1 | 3/2005 | Sato |
| 2005/0188211 A1 | 8/2005 | Scott et al. |

OTHER PUBLICATIONS

Notification of Transmittal of the International Search Report and Written Opinion, PCT/US04/12846, Sep. 28, 2004, 8 pages.

Notification of Transmittal of the International Search Report and Written Opinion, PCT/US04/12847, Nov. 3, 2004, 7 pages.

Notification of Transmittal of the International Search Report and the Written Opinion, PCT/US04/30180, Mar. 27, 2006, 8 pages.

Anderson, D.C. et al., "Interposed Request Routing For Scalable Network Storage," ACM Transactions on Computer Systems, Feb. 2002, vol. 20, No. 1, pp. 1-24.

Bright, J.D. et al., "A Scalable Architecture For Clustered Network Attached Storage," Twentieth IEEE/Eleventh NASA Goddard Conference On Mass Storage Systems & Technologies, Apr. 7-10, 2003, 12 pages, Paradise Point Resort, San Diego, CA, USA.

Goldick, J., "Retry Of Extending Networking Design Notes," PSC, Carnegie-Mellon University, Feb. 1995, 42 pages.

"Leveraging The Benefits Of The EMC CLARiiON IP4700 Network File Server With The Oracle8i Database," an Engineering White Paper, Mar. 5, 2002, EMC Corporation.

"Notification Of Transmittal Of The International Search Report And The Written Opinion Of The International Searching Authority, Or The Declaration," for PCT/US04/12844, Mar. 14, 2005, 14 pages.

A Scalable Architecture for Clustered Network Attached Storage, IEEE/NASA MSST2003, April 7-10, San Diego, California, U.S.A.

Leveraging the Benefits of the EMC CLARiiON IP4700 NFS with the Oracle8i Database, an Engineering White Paper, Mar. 5, 2002, EMC Corporation.

Anderson et al., Interposed Request for Scalable Network Storage, ACM Transactions on Computer Systems, vol. 20, No. 1, Feb. 2002.

Jonathan Goldick, Retry of extending networking design notes, PSC, Carnegie-Mellon University, Feb. 1995.

PCT International Search Report and Written Opinion, PCT/US06/25430, May 8, 2007, 8 pages.

* cited by examiner

FILE SERVER MODULE
114

File Server Interface
210

Migration Module
220

Redirection Module
230

FIG. 2

TRANSPARENT FILE MIGRATION USING NAMESPACE REPLICATION

CROSS-REFERENCE TO RELATED APPLICATIONS

This application claims priority under 35 U.S.C. § 119(e) to: U.S. Provisional Patent Application No. 60/465,579, filed on Apr. 24, 2003, entitled "Method and Apparatus for Transparent File Migration Using the Technique of Namespace Replication," by Thomas K. Wong et al.; U.S. Provisional Patent Application No. 60/465,578, filed on Apr. 24, 2003, entitled "Method and Apparatus for Transparent File Replication Using the Technique of Namespace Replication," by Thomas K. Wong et al.; and is related to U.S. patent application Ser. No. 10/831,701, filed on Apr. 23, 2004, entitled "Transparent File Replication Using Namespace Replication," by Thomas K. Wong et al., each of which applications are herein incorporated by reference in their entirety.

BACKGROUND OF THE INVENTION

1. Field of the Invention

This invention relates generally to storage networks and, more specifically, to a network device that uses namespace replication to migrate files between file servers in a decentralized storage network.

2. Description of Related Art

In a computer network, NAS (Network Attached Storage) file servers connected directly to the network provide an inexpensive and easily configurable solution for a storage network. These NAS file servers are self-sufficient because they contain file systems that allow interoperability with clients running any operating system and communication using open protocols. For example, a Unix-based client can use the NFS (Network File System) protocol by Sun Microsystems, Inc. of Santa Clara, Calif. and a Windows-based client can use CIFS (Common Internet File System) by Microsoft Corp. of Redmond, Wash. to access files on a NAS file server. However, the operating system does not affect communication between the client and file server. Thus, NAS file servers provide true universal file access.

By contrast, more expensive and powerful SAN (Storage Area Network) file servers use resources connected by Fibre Channel on a back-end, or a dedicated network. A SAN file system is part of the operating system or an application running on the client. But heterogeneous client operating systems may require additional copies of each file to be stored on the storage network to ensure compatibility on the SAN file server. Additionally, communication between file servers on a SAN use proprietary protocols and thus are typically provided by a common vendor. As a result, NAS file servers are preferred when price and ease of use are major considerations. However, the benefits of NAS storage networks over SAN storage networks also have drawbacks.

One drawback with NAS file servers is that there is no centralized control. Accordingly, each client must maintain communication channels between each of the NFS file servers separately. When NAS file servers are either added or removed from the storage network, each client must mount or unmount directories for the associated storage resources as appropriate. This is particularly inefficient when there are changes in hardware, but not in the particular files available on the network, such as when a failing NAS file server is swapped out for an identically configured back-up NAS file server.

A related drawback is that a client must be reconfigured each time a file is relocated within the storage network, such as during file migration or file replication. The client generates a NAS file handle that identifies a physical location of the directory or file object on the file server. To access the object, the client sends an object access request directly to the NAS file server. When the file is relocated to a different NAS file server, subsequent requests for access to the file require a new look-up to locate the file and generate a new NAS file handle.

An additional drawback is that NAS file servers are inaccessible during large data transfer operations such as file migrations and replications. Such data transfers typically occur during non-business hours to reduce consequential downtime. However, ever-larger storage capacities increase the amount of time necessary for data transfers. Additionally, many enterprises and applications have a need for data that is always available.

Therefore, what is needed is a network device to provide transparency to clients of file servers such as NAS file servers. Furthermore, there is a need for the network device to allow file migrations to occur without the need for client reconfiguration. Moreover, there is a need for the network device to provide access to the data during file migration.

BRIEF SUMMARY OF THE INVENTION

The present invention meets these needs by providing file migrations in a decentralized storage network that are transparent to a client. A NAS switch, in the data path of a client and NAS file servers, reliably coordinates file migration of a source file server to a destination file server using namespace replication to track new file locations. Additionally, the NAS switch maintains data availability during time-consuming data transfers.

An embodiment of a system configured according to the present invention comprises the NAS switch in communication with the client on a front-end of the storage network, and both a source file server and a destination file server on a back-end. The NAS switch associates NAS file handles (e.g., CIFS file handles or NFS file handles) received from the source and destination file servers with switch file handles that are independent of a location. The NAS switch then exports switch file handles to the client. In response to subsequent object access requests from the client, the NAS switch substitutes switch file handles with appropriate NAS file handles for submission to the appropriate NAS file server.

In another embodiment, the NAS switch further comprises a migration module to coordinate the migration of source files at locations on the source file server to destination files at locations on the destination file server. The migration module separately performs namespace replication and data replication. Namespace replication copies the namespace of the directory hierarchy on the source file server to the destination file server. Namespace replication can also include the use of stored file handles as pointers from the source file server to files migrated to the destination file server, or as pointers from the destination file server to files yet to be migrated from the source file server. Next, the migration module migrates the data and swaps stored file handles In yet another embodiment, the migration module updates a file migration table upon successful migration of an object. Accordingly, the migration module enters the location of the object on the source file server and the location of the object on the destination file server. When an object access request is received, the NAS switch searches the file migration table according to the switch file handle. If a there is a match, the NAS switch sends the object access request to the location on the destination file server. Otherwise, the NAS switch sends the object access request to the location on the source file server. Advantageously, the migration module provides migration services to decentralized file servers and file servers that do not otherwise natively support migration.

In still another embodiment, during migration, the migration module duplicates namespace access requests to both the namespace on the source file server and the replicated namespace on the destination file server.

BRIEF DESCRIPTION OF THE DRAWINGS

FIG. 2 is a block diagram illustrating a NAS switch according to one embodiment of the present invention.

DETAILED DESCRIPTION OF THE INVENTION

The present invention provides file migrations in a storage network that are transparent to the clients. A NAS (Network Attached Storage) switch in the data path of a client and NAS file servers on the storage network, uses namespace replication to coordinate file migration between decentralized servers while maintaining data availability to a client. Some embodiments of a system are described with respect to FIGS. 1-2, and some embodiments of a method operating therein are described with respect to FIGS. 3-10.

The accompanying description is for the purpose of providing a thorough explanation with numerous specific details. Of course, the field of storage networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. For example, although the present invention is described with reference to storage networks operating under the NAS protocol, it can similarly be embodied in future protocols for decentralized storage networks other than NAS, or in mixed protocol networks. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripts.

Figure 1:
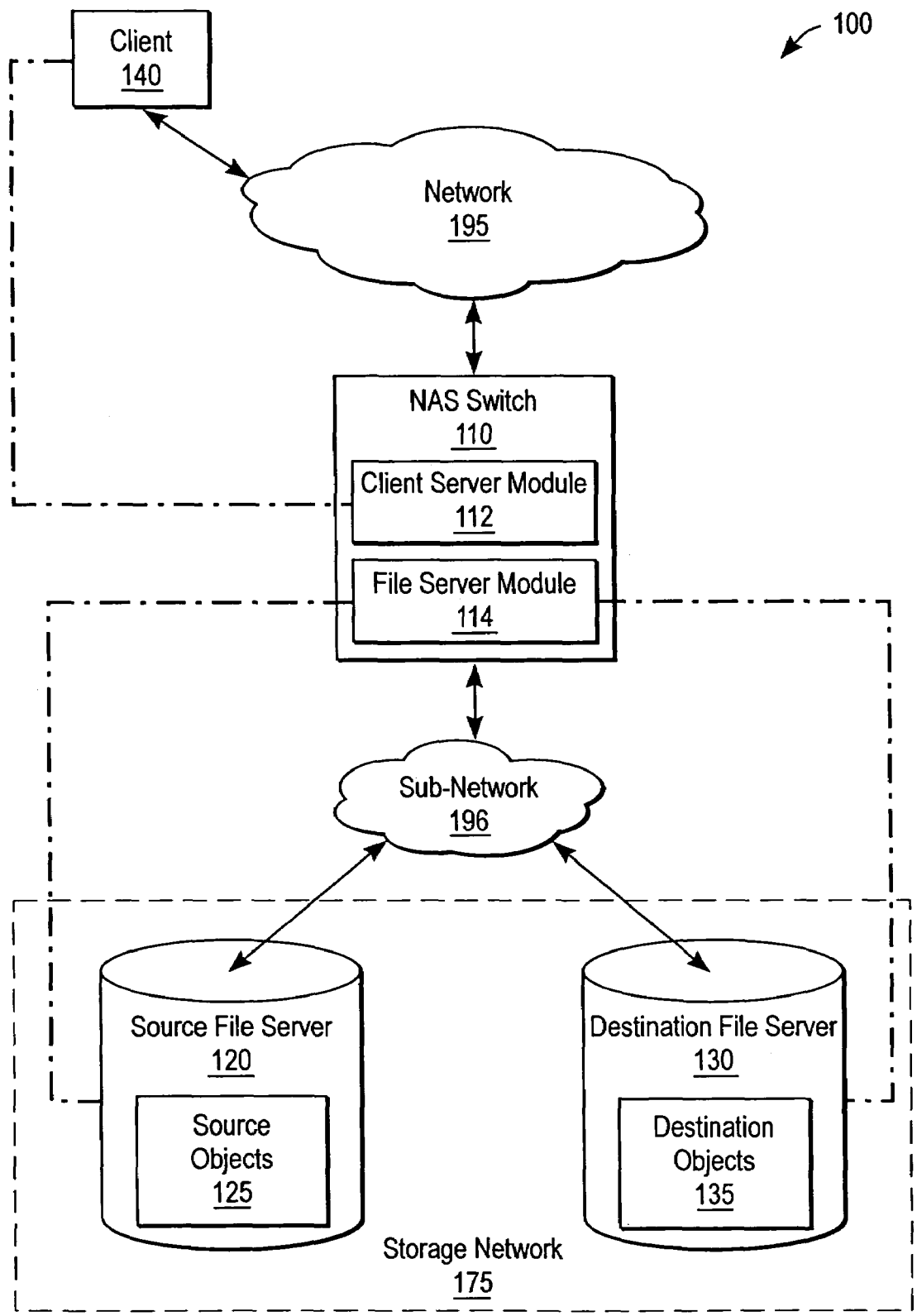
FIG. 1 is a high-level block diagram illustrating a storage network system according to one embodiment of the present invention.

FIG. 1 is a high-level block diagram illustrating a storage network system 100 according to one embodiment of the present invention. The system 100 comprises a NAS switch 110 and a client 140 coupled to a network 195. The NAS switch 110, a source file server 120, and a destination file server 130, are each coupled in communication through a sub-network 196. Note that there can be various configurations of the system 100, such as embodiments including additional clients 140, additional source and/or destination file servers 120, 130, and additional NAS switches 110. The system 100 components are implemented in, for example, a personal computer with an x86-type processor executing an operating system and/or an application program, a workstation, a specialized NAS device with an optimized operating system and/or application program, a modified server blade, etc. In one embodiment, the storage network 175 comprises a NAS using protocols such as NFS and CIFS. In another embodiment, the storage network 175 comprises a combination of NAS, SAN, and other types of storage networks. In yet another embodiment the storage network 175 comprises a decentralized standard or proprietary storage system other than NAS.

The NAS switch 110 provides continuous transparency to the client 140 with respect to object management. Specifically, the NAS switch can off-load tasks related to physical configurations, object management, object migration, object replication, efficient storage and/or other services on the storage network 175. Preferably, the NAS switch 110 emulates file server processes to the client 140 and emulates client processes to the file servers 120, 130. Accordingly, the client 140 is unaware of the NAS switch 110 since the NAS switch 110 is able to redirect NAS requests intended for the source file server 120 to appropriate locations on the destination file server 130. Thus, the client 140 submits object requests, such as file writes and directory reads, directly to the NAS switch 110. Likewise, the file servers 120, 130 are unaware of the NAS switch 110 since the NAS switch 110 is able to resubmit requests, contained in server file handles, as if they originated from the client 140. To do so, the NAS switch 110 can use mapping, translating, bridging, packet forwarding, other network interface functionality, and other control processes to perform file handle switching, thereby relieving the client 140 of the need to track changes in a file's physical location.

In one embodiment, the NAS switch 110 comprises a client module 112 and a file server module 114 to facilitate communications and file handle switching. The client module 112 receives exported file system directories from the file servers 120, 130 containing NAS switch handles. To create compatibility between the client 140 and the NAS switch 110, the client module 112 maps the file system directories to internal switch file systems which it sends to the client 140. To request an object, the client 140 traverses an exported switch file system and selects a switch file handle which it sends to the NAS switch 110 along with a requested operation.

The file server module 114 coordinates migration processes. The file server module 114 initiates tasks that are passively performed by the source and destination file server 120, 130, which may not have native migration capabilities. The file server module 114 replicates a namespace containing the data to be migrated from the source file server 120 to the destination file server 130, and then replicates associated data. During and afterwards, the file server module 114 redirects namespace and file object accesses request by the client 140 to appropriate locations. Thus, data transfer services remain available to the client 140.

In one embodiment, the file server module 114 also tracks reconfigurations resulting from migration, replication and other object relocation processes (e.g. adding or removing file server capacity) with a nested system of tables, or information otherwise linked to the switch file systems. The switch file handles are static as they are persistent through the relocation processes, but the associated NAS file handles can be dynamic as they are selected depending upon an object's current location. To track various copies of an object, the file server module 114 maintains a file handle migration table and a file handle replication table corresponding to each file system that maps NAS file handles of migrated and replicated objects to locations on the storage network 175. Further embodiments of the file server module 114 are described with respect to FIG. 2.

The client module 112 associates 310 a NAS file handle with a switch file handle as described below with respect to FIG. 4. This enables the NAS switch 110 to act as an intermediary between the client 140 and the file servers 120, 130. The client 140 submits NAS requests using switch file handles as if the NAS switch 110 were a file server 120, 130, and, in turn, the file servers 120, 130 process NAS file handles from the NAS switch 110 as if they were submitted by the client 140.

In general, NAS file handles uniquely identify objects, such as a directory file server, on the file servers 120, 130, such as a directory or file, as long as that object exists. NAS file handles are file server specific, and are valid only to the file servers 120, 130 that issued the file handles. The process of obtaining a file handle from a file name is called a look-up. The NAS file handle may be formatted according to protocols such as NFS or CIFS as discussed in further detail below, e.g., with reference to Tables 1A and 1B. By contrast, a switch file handle identifies a directory or file object independent of location, making it persistent through file replications, migrations, and other data transfers. The switch file handle can be a modified NAS file handle that refers to an internal system within the NAS switch 110 rather than the source file server 120. This enables the NAS switch 110 in mapping persistent file handles to a choice of alternative NAS file handles. An original NAS file handle refers to an initial object location on the source file server 120. A stored NAS file handle refers to a NAS file handle, stored as an object on the file servers 120, 130, which points to an alternative file location.

Object access requests handled by the NAS switch 110 include, for example, directory and/or file reads, writes, creation, deletion, moving, and copying. A namespace access refers to an operation accessing or modifying the namespace such as look-up, rename, delete, or create. A file access refers to an operation accessing or modifying files such as read or write. An object can refer to a directory object or a file object. Directory objects can further comprise sub-directories and file objects within directory. As used herein, various terms are used synonymously to refer to a location of an object prior to migration (e.g., "primary"; "source"; "original"; and "first") and various terms are used to refer to a location of the same object after migration (e.g., "replica"; "destination"; "substitute"; and "second"). Further embodiments of the NAS switch 110 and methods operating therein are described below.

The client 140 accesses resources on the file servers 120, 130 by submitting a switch file handle to the NAS switch 110, intended for the source file server 120. To find the switch handle, the client 140 first mounts an exported switch file system containing switch file handles. The client 140 looks-up an object to obtain its file handle and submits an associated request. From the perspective of the client 140, transactions are carried out by the file servers 120, 130 having object locations that do not change. Thus, the client 140 interacts with the NAS switch 110 before and after a file replication in the same manner. A user of the client 140 can submit operations through a command line interface, a windows environment, a software application, or otherwise. In one embodiment, the NAS switch 110 further provides access to a storage network 175 other than a NAS storage network.

The source file server 120 is the default or original network file server for the client 140 before file migration. The source file server 120 further comprises source objects 125, which include namespace directories and files such as enterprise data, records, database information, applications, and the like. The source file server 120 can store a table of migrated directories maintained by the NAS switch 110 that correlate results from namespace migration. Moreover, the source file server 120 can store a file handle migration table, maintained by the NAS switch 110, denoting each migrated directory and file object. The source file server 120 comprises, for example, a personal computer using an x86-type processor with an operating system and/or an application, a workstation, a specialized NAS device with an optimized operating system and/or application, a modified server blade, etc.

The destination file server 130 becomes the primary network file server used by the NAS switch 110 after file migration. The destination file server 130 further comprises destination objects 135, which include the replicated namespace directories and source files. The destination file server 130 can comprise the same hardware and/or software as described with reference to the source file server 120. The source and destination file servers 120, 130 are preferably NAS file server, but can also be file servers using other decentralized protocols that do not inherently support file migration. Further embodiments of the source and destination file servers 120, 130 and related methods are described below.

The network 195 facilitates data transfers between connected hosts (e.g., 110, 140). The connections to the network 195 may be wired and/or wireless, packet and/or circuit switched, and use network protocols such as TCP/IP (Transmission Control Protocol/Internet Protocol), IEEE (Institute of Electrical and Electronics Engineers) 802.11, IEEE 802.3 (i.e., Ethernet), ATM (Asynchronous Transfer Mode), or the like. The network, 195 comprises, for example, a LAN (Local Area Network), WAN (Wide Area Network), the Internet, and the like. In one embodiment, the NAS switch 110 acts as a gateway between the client 140, connected to the Internet, and the directory file server 120, and the shadow file servers 130, connected to a LAN. The sub-network 196 is preferably a local area network providing optimal response time to the NAS switch 110. In one embodiment, the sub-network 196 is integrated into the network 195.

FIG. 2 is a block diagram illustrating the file server module 112 according to one embodiment of the present invention. The file server module 114 comprises a file server interface 210, a migration module 220, and a redirection module 230. Generally, the file server interface 210 manages operations before migration, the migration module 220 maintains data availability during migration, and the redirection module 230 provides transparency to the client 140 after migration. Note that modules are merely exemplary groupings of functionality.

Prior to file migration, the file server interface 210 receives a switch file handle with a request from the client 140 which it uses to find an original NAS file handle. The file server interface 210 submits the original NAS file handle with the request to the source file server 120. If the object has yet to change locations in the storage network 175, the file server interface 210 uses the original NAS file handle. The file server interface 210 can submit the switch file handle to the migration module 220 to determine if the object is part of a data migration. Also, the file server interface 220 can submit the switch file handle to the redirection module 230 to determine if the object has completed data migration. In either case, an appropriate NAS file handle is returned for the file server interface 210 to use in forwarding the client request to the appropriate file server 120, 130

During file migration, a migration module 220 in the NAS switch 110 coordinates migration from the source file server 120 to the destination file server 130 using namespace replication. Namespace replication copies directory metadata of the source file server 120 separately from the data itself. As the migration module 220 walks through the directories to copy data, it updates a file handle migration table that indicates whether an object has been migrated, and if so, where the object has been migrated. Because the namespace replication is many times faster than the data migration, directory services remain available even while the data migration occurs. The file handle migration table provides a current list of which objects have been migrated so that the NAS switch 110 is able to provide nearly continuous data availability. In one embodiment, the NAS switch can reconstruct the file handle migration table in response to, for example, a device crash or data corruption.

After file migration, the redirection module 230 looks-up switch file handles received from the client 140 in the file handle migration table. IF an object has been migrated, the redirection module outputs a destination NAS file handle corresponding to a location on the destination file server 130.

Figure 3:
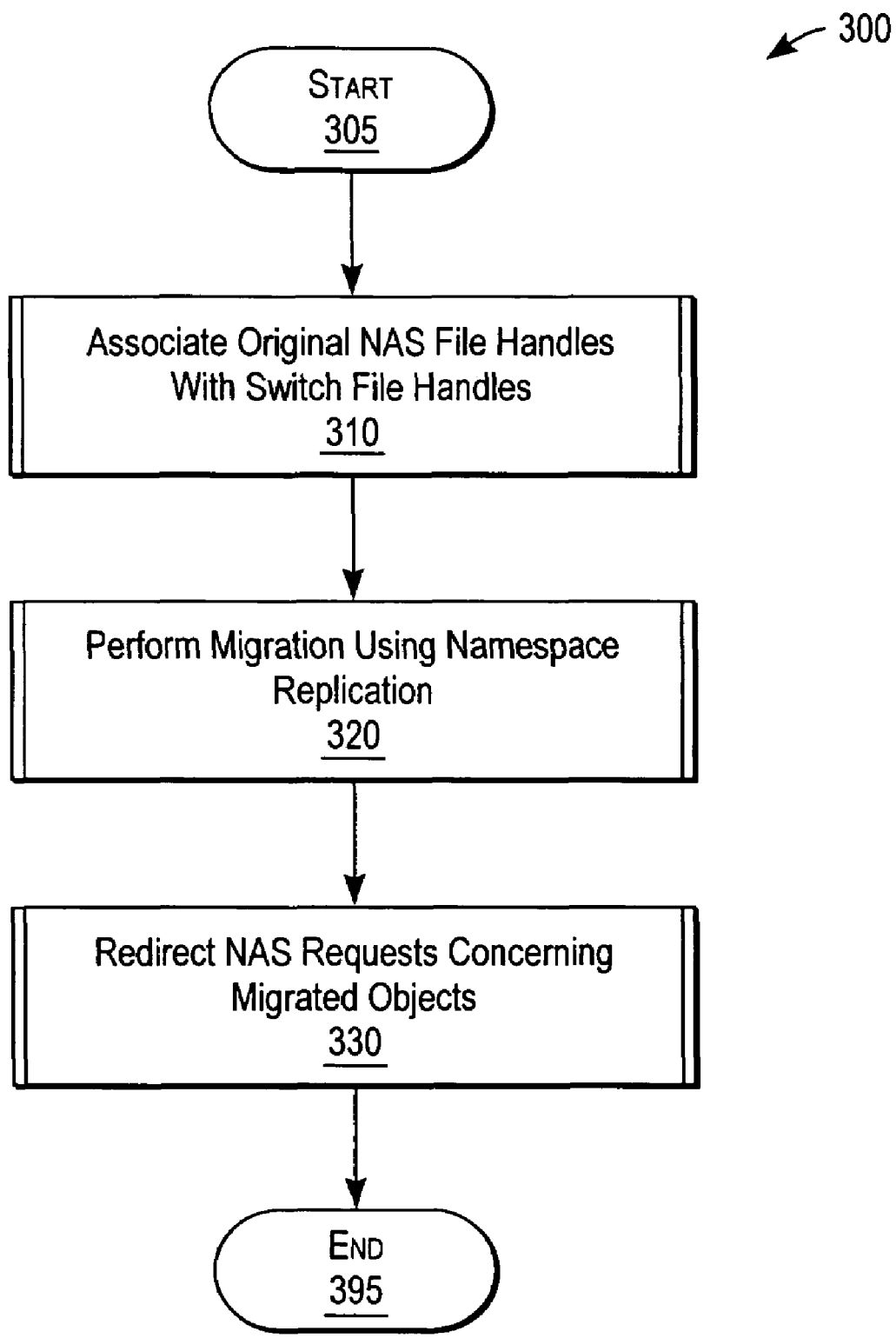
FIG. 3 is a high-level flow chart illustrating a method of providing transparent file migration in a NAS storage network according to one embodiment of the present invention.

FIG. 3 is a high-level flow chart illustrating a method 300 of providing transparent file migration in a NAS storage network according to one embodiment of the present invention. The client module 112 associates 310 an original NAS file handle with a switch file handle as described below with respect to FIG. 4. This enables the NAS switch 110 to act as an intermediary between the client 140 and the file servers 120, 130. The client 140 submits NAS requests using switch file handles as if the NAS switch 110 were a file server 120, 130, and, in turn, the file servers 120, 130 process NAS file handles from the NAS switch 110 as if they were submitted by the client 140.

The migration module 220 performs 320 file migration using namespace replication as described below with respect to FIGS. 5-9. By separating directory replication from data replication, the migration module 220 is able to maintain availability and data integrity between the file servers 120, 130.

The redirection module 230 redirects 330 NAS requests concerning migrated files as described below with respect to FIG. 10. Because the NAS switch 110 coordinates and stores elements involved in migration, the client 140 continues referring to objects stored in alternative locations with the same switch file handle used prior to replication. On the back end, however, many changes can occur. For example, file migration relocates the source objects 125 from the source file server 120 to the destination file server 120.

Figure 4:
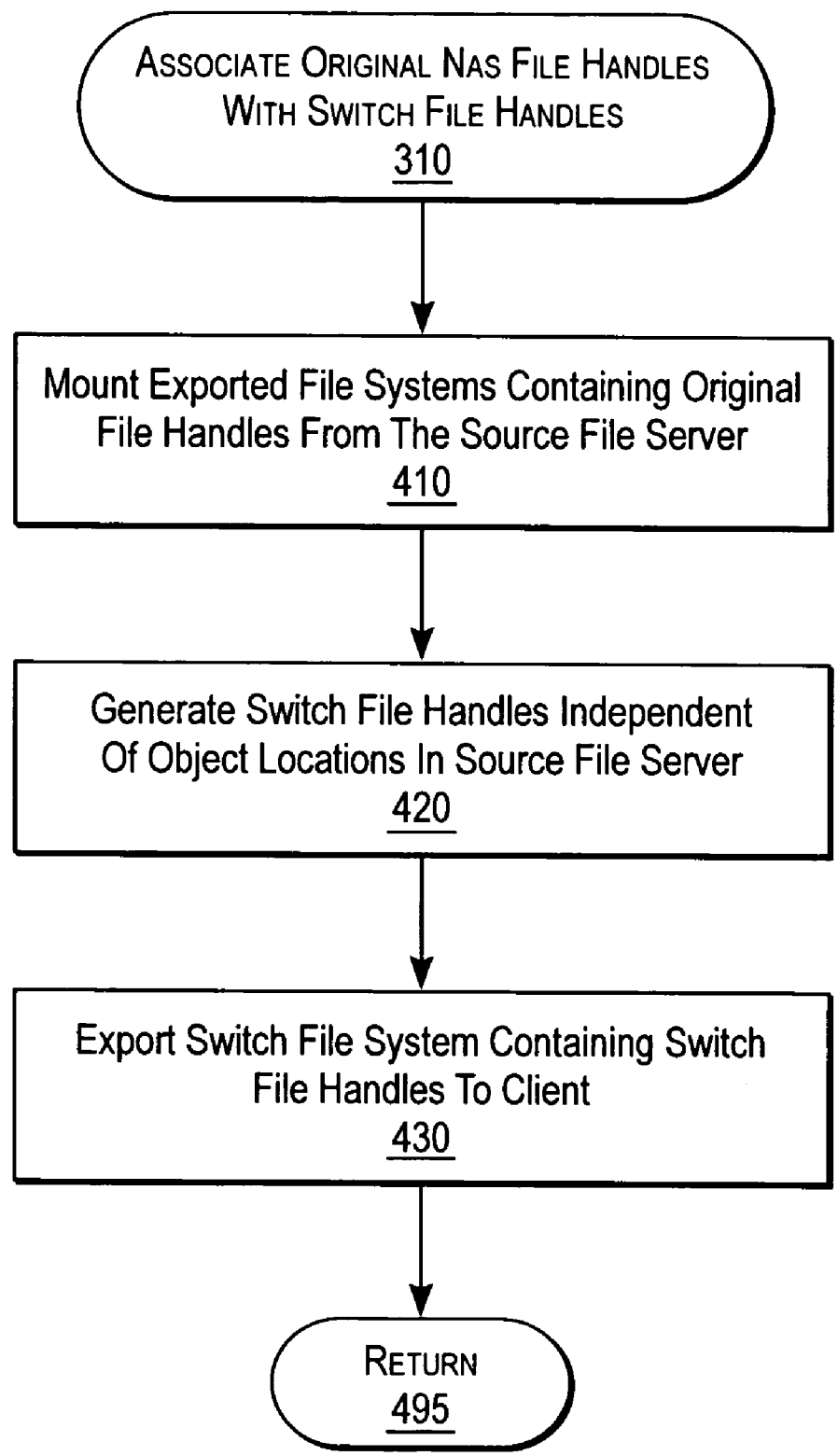
FIG. 4 is a flow chart illustration a method of associating original NAS file handles with switch file handles according to one embodiment of the present invention.

FIG. 4 is a flow chart illustration the method 310 of associating a NAS file handle with a switch file handle according to one embodiment of the present invention. Initially, the NAS switch 110 mounts 410 an exported directory of file systems from the primary server 120. in general, the file system organizes objects on the file servers 120, 130 into a directory hierarchy of NAS file handles. In one embodiment, the NAS switch 110 receives exported directories from associated source file servers 120 and, in turn, sends exported directories to associated clients 140.

The client module 112 generates 420 switch file handles independent of object locations in the primary file server 120. The client module 112 organizes exported file systems from the file server 120 by replacing file system or tree identifiers with a switch file system number as shown below in Tables 2A and 2B. The client module 112 exports 430 the switch file system to the client 140 to use in requesting operations. In the reverse process, the NAS switch 110 receives the NAS request and searches replicated file handles and/or replicated namespaces using the NAS file handle. Accordingly, the file server interface 210 checks entries of nested tables maintained by the synchronization module 230. The file server interface 210 generates a NAS file handle from the switch file handle based on an object location. An example of the contents of an NFS and CIFS file handle are shown in Tables 1A 1B, while an example of switch file handles or modified NFS and CIFS file handles are shown in Tables 2A and 2B:

TABLE 1A

NFS File Handle Contents

| Field Name | Description |
| --- | --- |
| fsid | File system identification - identifies an exported file system of a file server |
| file id | File identification - identifies a file or directory object of an exported file system |
| gen id | Generation identification - changes each time the file identification is re-used to identify a different file or directory object |

TABLE 1B

CIFS File Handle Contents

| Field Name | Description |
|---|---|
| tree id | Tree identification - assigned by a CIFS server |
| file id | File identification - unique within a tree identification |

TABLE 2A

Contents of NFS Switch File Handle

| Field Name | Description |
|---|---|
| file system id | File system identification - index to NAS switch 110 file system export table that identifies the name and location of a NAS files search |
| file id | File identification - identifies a file or directory object of an exported file system |
| gen id | Generation identification - changes each time the file identification is re-used to identify a different file or directory object |

TABLE 2B

Contents of CIFS Switch File Handle

| Field Name | Description |
|---|---|
| file system id | File system identification - index to NAS switch 110 file system export table that identifies the name and location of a NAS files search |
| file id | File identification - unique within a tree identification |

As discussed below, after objects have been migrated, the NAS switch 110 can accesses objects at new locations using updated NAS file handle.

Figure 5:
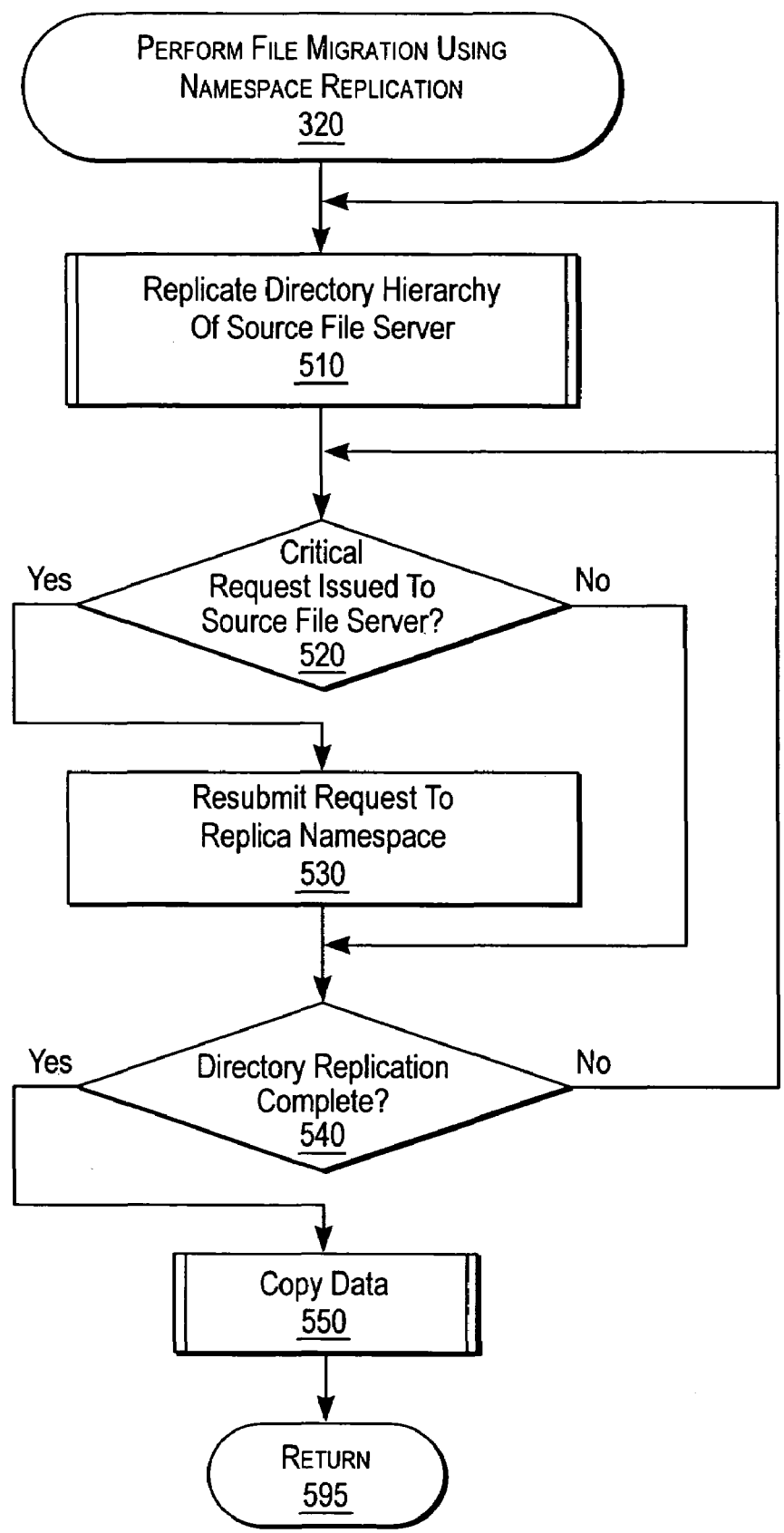
FIG. 5 is a flow chart illustrating a method of performing file migration using namespace replication according to one embodiment of the present invention.

FIG. 5 is a flow chart illustrating the method 220 of performing file migration using namespace replication according to one embodiment of the present invention. The migration module 220 replicates 510 a directory hierarchy of the source file server 120 as described below with respect to FIGS. 6-7. In one embodiment, when an object access request such as a directory operation is received from the client 140, it is sent to both the first and destination file servers 120, 130 to maintain consistency between the namespace and replicated namespace. A directory can thus be created or deleted during the file migration process whereas in the systems of the prior art, the directory would be locked so that such operations would not be possible.

If a critical directory request is issued to the source file server 520 during file migration 510, the migration module 220 resubmits 530 the request to update the replicated namespace. Preferably, the replicated namespace is stored on the destination file server 130. As a result, when operations such as a create directory, create file, delete, directory, delete file, and the like affect the source namespace, that same modification is made to the replicated namespace. Once the directory replication is complete 540, critical directory operations can be submitted directly to the replicated namespace. In a separate process, the migration module 220 copies 550 data from the source file server 120 to the destination file server 130.

Figure 6:
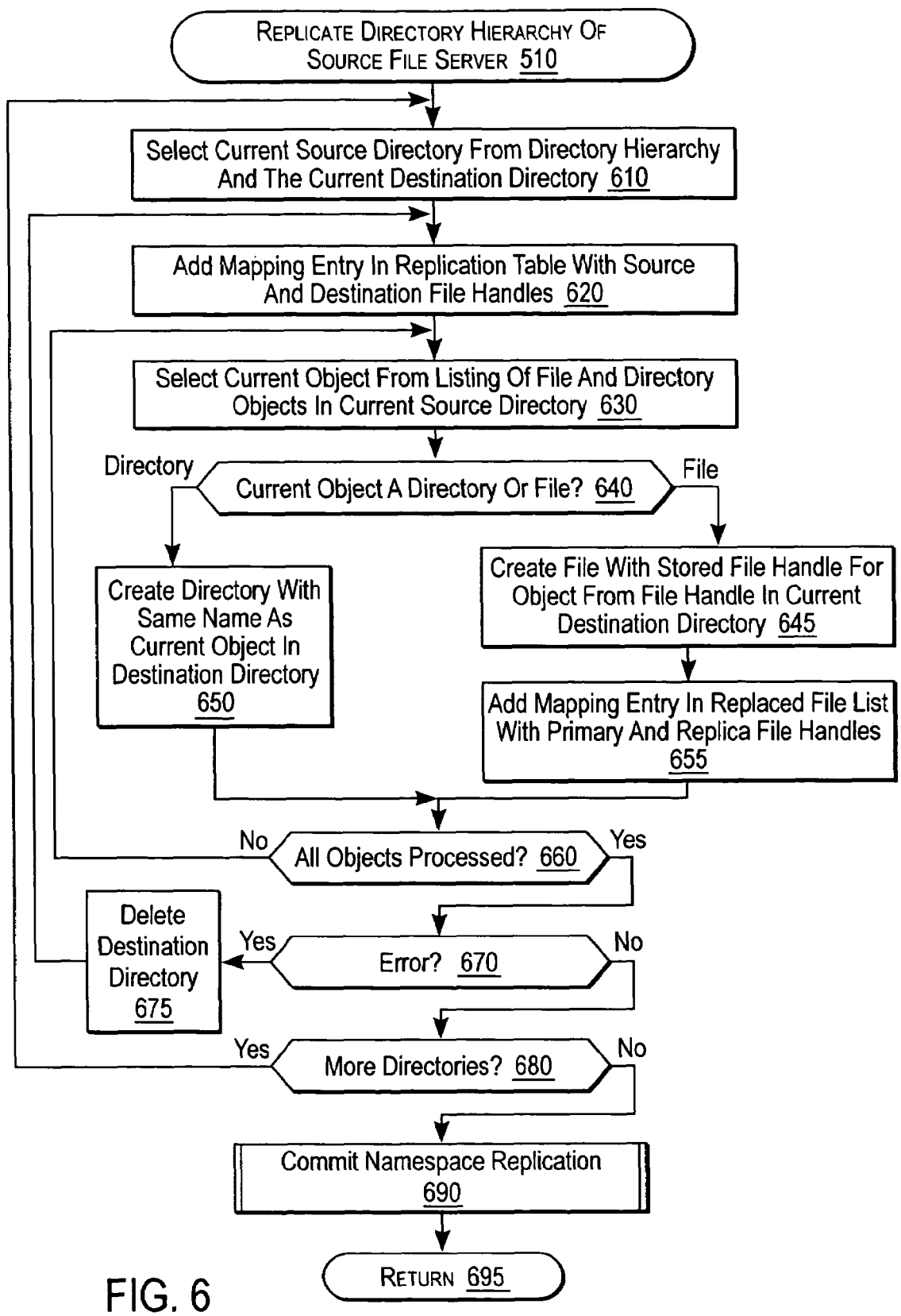
FIG. 6 is a flow chart illustrating a method of replicating a directory hierarchy of a source file server according to one embodiment of the present invention.

FIG. 6 is a flow chart illustrating the method 510 of replicating a directory hierarchy from the source file server 120 to the destination file server 130 according to one embodiment of the present invention. The reproduction module 220 selects 610 a current source directory from the directory hierarchy of the source file server 120 and the current destination directory from the destination file server 130. The migration module 220 adds 620 a mapping entry in a replication table with switch file handles related to the source and destination locations. The migration module 220 selects 630 a current object from a listing of file and directory objects in the current source directory.

If the current object is a directory 530, the migration module 220 creates 650 a directory in the destination file server 130 with the same name as the current directory in the primary file server 120. On the other hand, if the current object is a file 640, the reproduction module 220 creates 645 a file with a stored file handle for the object from the file handle in the current destination directory. In one embodiment, the stored file handle is similar to the switch file handle. Preferably, the stored file handle is a predetermined size so that the NAS switch 110 can determine whether a file contains a stored file handle merely by inspecting the file's size. An exemplary stored file format is shown in Table 3:

TABLE 3

Exemplary Stored File Handle

| Byte Offset | Length | Name | Description |
|---|---|---|---|
| 0-3 | 4 | Stored file handle identifier | 0x06072022 |
| 4-7 | 4 | Stored file handle type | =1 for NFS, =2 for CIFS |
| 8-11 | 4 | Size of stored file handle | Hash value from switch file handle |
| 12-15 | 4 | Contents of stored file handle | Size in bytes |
| 12-size of switch file handle | Size of switch file handle | Padding | See above description |
| | Enough bytes to pad to a length of 419 bytes for NFS and 431 bytes for CIFS | | =0x0 byte |

Note, however, that there can be variations of the stored file format. The migration module 220 adds 655 a mapping entry in a replicated file list with source and destination switch file handles.

If all objects have been processed 660, no errors were committed in the process 670, and there are no more directories to replicate 680, the reproduction module 220 commits 690 the namespace replication. However, if there are more objects to be processed 660, the migration module 220 continues the process from selecting 630 objects. If there was an error in the directory or file creation 670, the reproduction module 220 deletes 675 the destination directory, and repeats the process from adding 620 mapping entries. Also, if there are more directories to process 680, the first file server 120 returns to selecting 510 primary directories.

Figure 7:
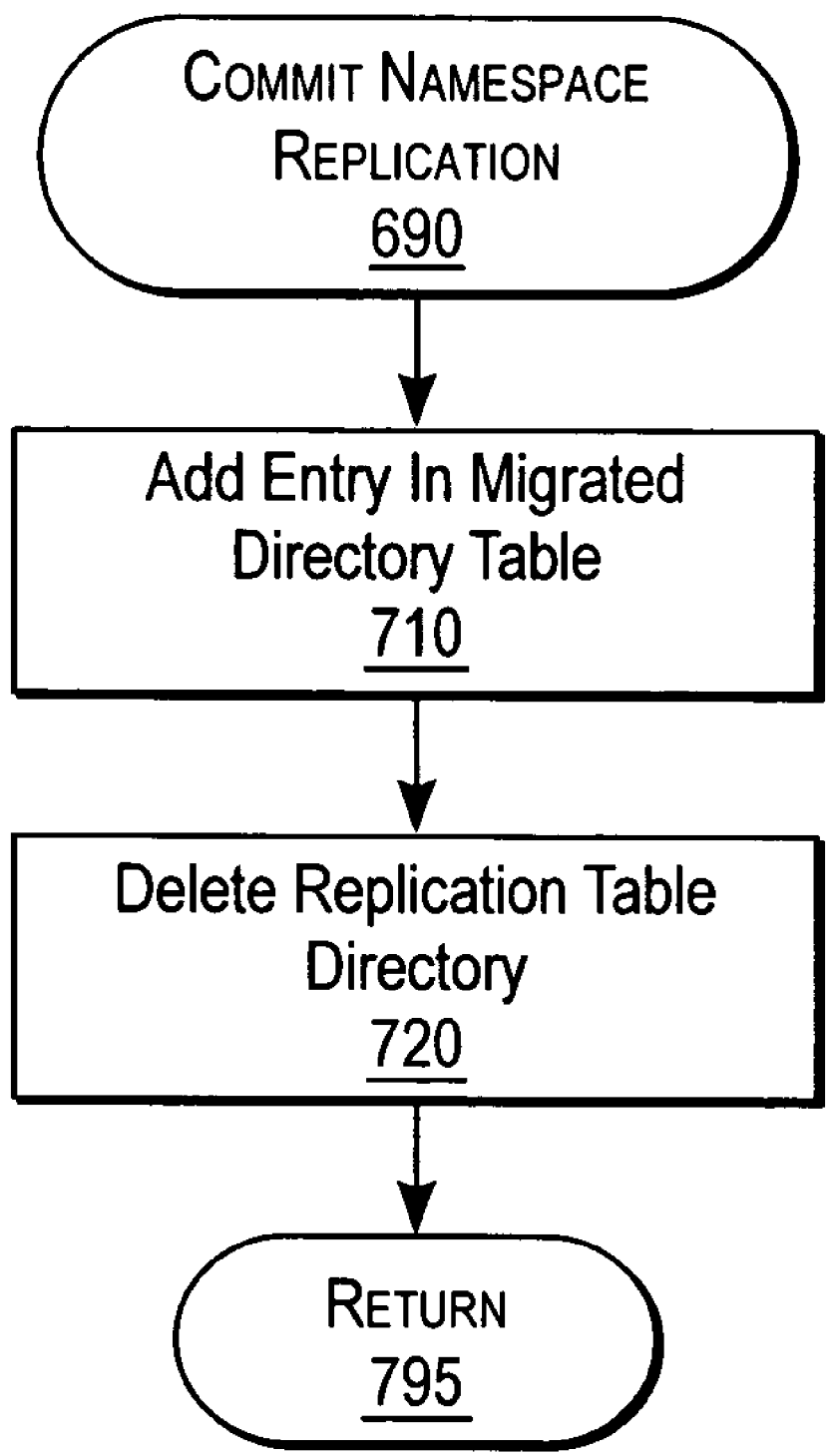
FIG. 7 is a flow chart illustrating a method of committing namespace replication according to one embodiment of the present invention.

The migration module 220 commits 690 the namespace as shown in FIG. 7. FIG. 7 is a flow chart illustrating the method 590 of committing the namespace replication according to one embodiment of the present invention. The migration module 220 adds 710 an entry to the migrated directory table. As a result, future object access requests will be directed to the destination file server 130 rather than the source file server 110. The source file server 120 deletes 720 the replication table since it is no longer needed.

Figure 8:
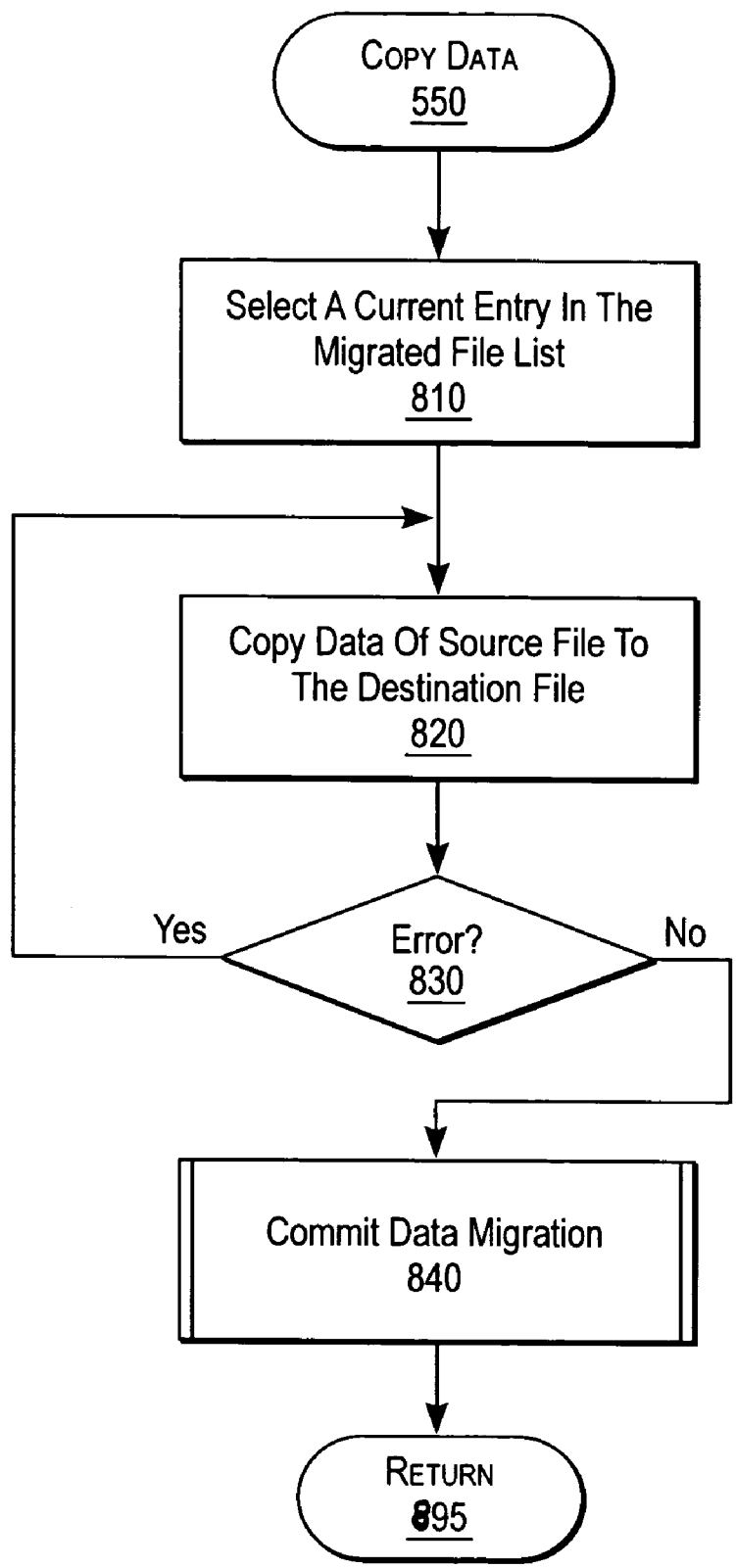
FIG. 8 is a flow chart illustrating a method of copying data according to one embodiment of the present invention.

FIG. 8 is a flow chart illustrating the method 420 of copying data according to one embodiment of the present invention. The NAS switch 110 selects 810 a current entry in the migrated file list. The source file server 120 copies 820 the data of the source objects 125 to the destination objects 135 in the destination file server 130.

Figure 9:
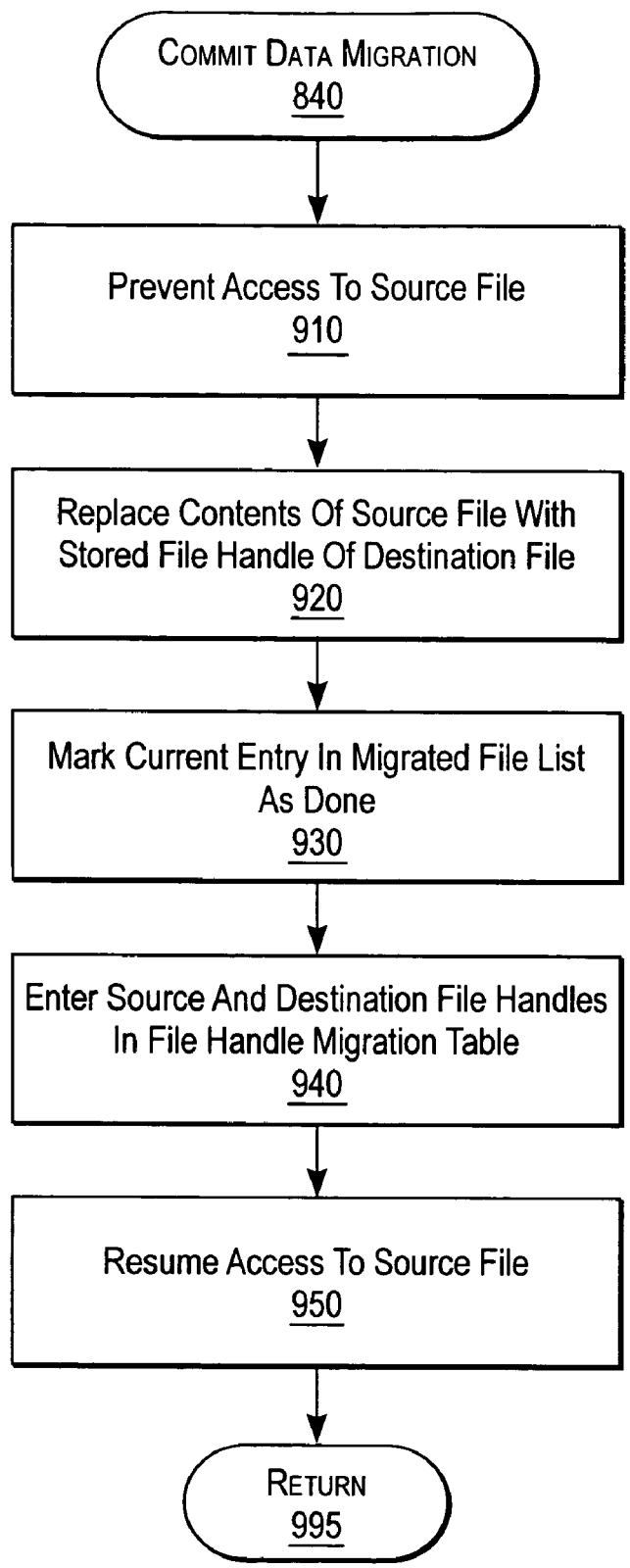
FIG. 9 is a flow chart illustrating a method of committing data migration according to one embodiment of the present invention.

If no error occurs during the data transfer 830, the destination file server 130 commits 840 the data migration as shown in FIG. 9. FIG. 9 is a flow chart illustrating the method 840 of committing data migration according to one embodiment of the present invention. The migration module 220 locks 910 the source file to prevent further access to the file. The migration module 220 replaces 920 the contents of the source file with a stored file handle indicating the new location on the destination file server 130. The migration module 220 marks 930 the current entry in the migrated file list as done, and enters 840 the source and destination file handles indicative of the locations on the source and destination file servers 120, 130 in the file handle migration table. Finally, the migration module 220 resumes 950 access to the source file.

In one embodiment, the migration module 220 reconstructs the migration module 220 due to, for example, a device crash or data corruption. To do so, the migration module 220 walks through the namespace of the source file server 120. Since the stored file handles have a consistent size, the migration module 220 can quickly recognize stored file handles and retrieve pointer information. This association is added to entries in a reconstructed file handle migration table.

Referring again to FIG. 8, if an error does occur 830, the data transfer is repeated. In one embodiment, the destination file server 110 detects an error by comparing the file size before migration to the file size after migration.

Figure 10:
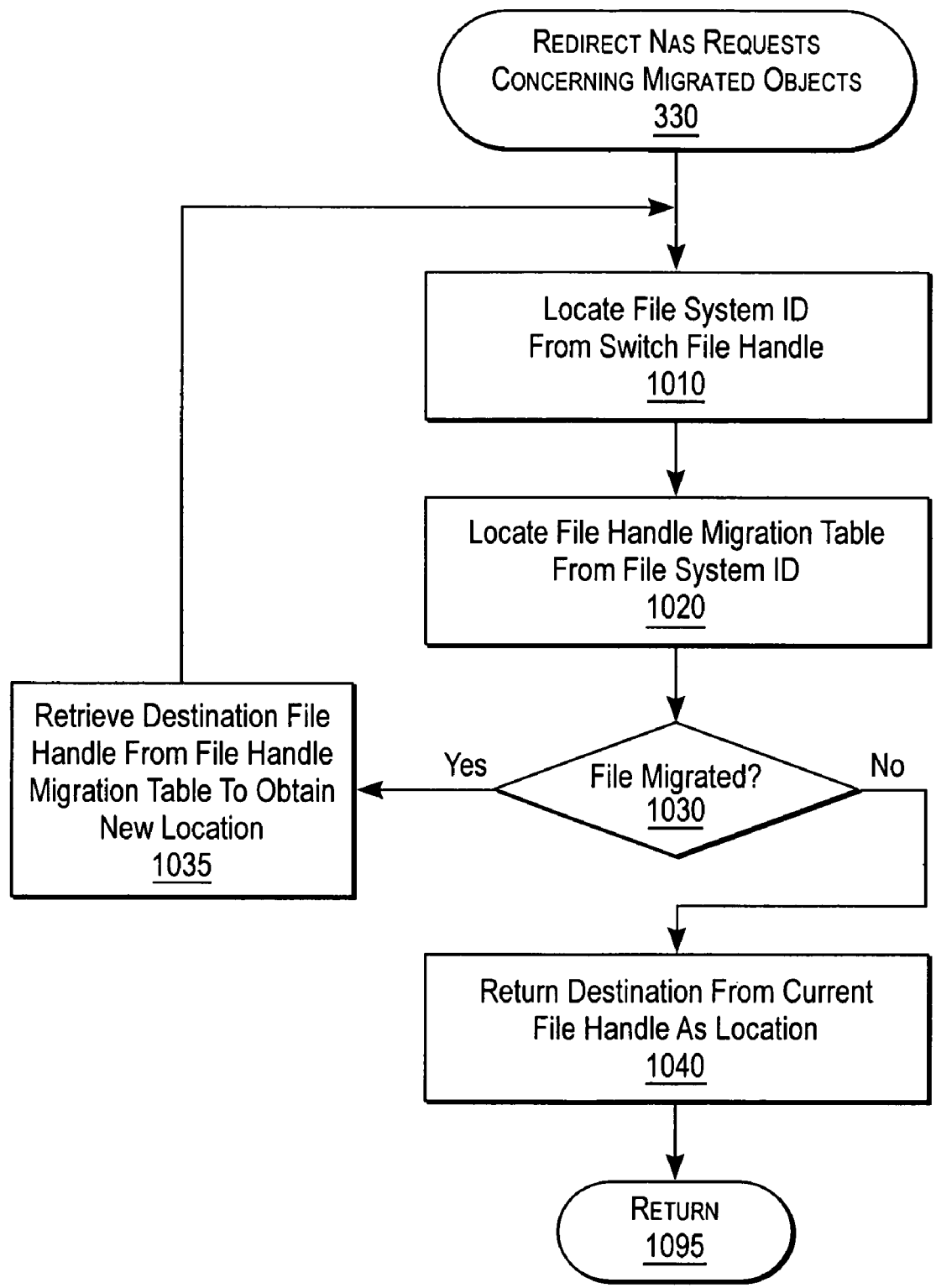
FIG. 10 is a flow chart illustrating a method of redirecting NAS requests concerning migrated objects according to one embodiment of the present invention.

FIG. 10 is a flow chart illustrating the method 330 of redirecting NAS requests concerning migrated objects according to one embodiment of the present invention. The NAS switch 110 locates 1010 a file system ID in the file systems table from the switch file handle. The NAS switch 110 next locates 1020 the file handle migration table from the file system ID. If the file has not migrated 1030, the NAS switch 110 forwards the client request using the source or original NAS file handle. If the file has migrated 1030, the NAS switch 110 retrieves the destination NAS file handle from the file handle migration table in the source file server 120.

We claim:

1. A method for accessing an object in a storage network, comprising:
   receiving a NAS (Network Attached Storage) file handle including a location of the object on a source file server;
   sending as representative of the object, a switch file handle that is independent of the location of the object;
   migrating the object from the location on the source file server to a location on a destination file server by separately replicating a namespace associated with the object and migrating data associated with the object, wherein prior to migrating the object, a stored file handle indicative of the location of the object on the source file server is stored in the location on the destination file server;
   receiving an access request associated with the switch file handle; and
   redirecting the access request to the location on the destination file server.

2. The method of claim 1, wherein the object comprises a directory having objects representative of sub-directories and files.

3. The method of claim 1, wherein the object comprises a file.

4. The method of claim 1, wherein the migrating the object comprises replicating a namespace associated with the object, the namespace located on the source file server and the replicated namespace located on the destination file server.

5. The method of claim 4, wherein the migrating the object further comprises:
   during migration, if the access request comprises a request to access or modify the namespace, sending the namespace access request to both the namespace and the replicated namespace during migration.

6. The method of claim 4, wherein migrating the object further comprises:
   after migrating the object, storing a stored file handle in the location on the source file server, the stored file handle indicative of the location of the object on the destination file server.

7. The method of claim 1, wherein the migrating the object comprises migrating data associated with the object.

8. The method of claim 1, wherein the migrating the object comprises updating a file handle migration table with an entry for the location on the source file server and an entry for the location on the destination file server responsive to a successful migration.

9. The method of claim 8, wherein the redirecting the access request further comprises:
   looking-up the object in the file migration table; and
   if the object is located, sending the access request to the location on the destination file server.

10. The method of claim 1, wherein the redirecting the access request further comprises:
    looking-up the object in the file migration table; and
    if the object is not located, sending the access request to the location on the source file server.

11. The method of claim 1, wherein the access request comprises a file access request including one from the group consisting of a read request and a write request.

12. The method of claim 1, wherein the access request comprises a namespace access request including one from the group consisting of a create request, a delete request, a move request, a copy request, a look-up request and a rename request.

13. The method of claim 1, wherein the NAS file handle comprises one from the group consisting of a NFS (Network File System) file handle and a CIFS (Common Internet File System) file handle.

14. A method for centrally accessing an object in a decentralized storage network, comprising:
    receiving an input file handle including a location of the object on a source file server;
    sending as representative of the object, a switch file handle independent of the location of the object;
    migrating the object from the location on the source file server to a location on a destination file server by separately replicating a namespace associated with the object and migrating data associated with the object, wherein prior to migrating the object, a stored file handle indicative of the location of the object on the source file server is stored in the location on the destination file server, wherein during migration an object access request is duplicated among a namespace on the source file server and a replicated namespace on the destination file server;

updating a file migration table after migration, the file migration table comprising an entry object locations on the first and destination file servers; and receiving an access request associated with the switch file handle; and redirecting the access request to the location on the destination file server.

15. The method of claim 14, wherein the decentralized storage network is a NAS (Network Attached Storage) storage network, wherein the access request is a NAS access request, and wherein the input file handle is a NAS file handle.

16. The method of claim 14, wherein the first and destination file servers include file systems and the client does not include the file system.

17. A computer program product, comprising: a computer-readable medium having computer program instructions and data embodied thereon for a method accessing an object in a NAS (Network Attached Storage) storage network, the method comprising:

receiving a NAS file handle including a location of the object on a source file server;

sending as representative of the object, a switch file handle independent of the location of the object;

migrating the object from the location on the source file server to a location on a destination file server by separately replicating a namespace associated with the object and migrating data associated with the object;

receiving an access request associated with the switch file handle; and redirecting the access request to the location on the destination file server, wherein during migration, the access request is sent to both the namespace and the replicated namespace.

18. The computer program product of claim 17, wherein the object comprises a directory having objects representative of sub-directories and files.

19. The computer program product of claim 17, wherein the object comprises a file.

20. The computer program product of claim 17, wherein the migrating the object comprises replicating a namespace associated with the object, the namespace located on the source file server and the replicated namespace located on the destination file server.

21. The computer program product of claim 20, wherein the migrating the object further comprises:

prior to migrating object, storing a stored file handle in the location on the destination file server, the stored file handle indicative of the location of the object on the source file server.

22. The computer program product of claim 20, wherein the migrating the object further comprises:

after migrating the object, storing a stored file handle in the location on the source file server, the stored file handle indicative of the location of the object on the destination file server.

23. The computer program product of claim 17, wherein the migrating the object comprises migrating data associated with the object.

24. The computer program product of claim 17, wherein the migrating the object comprises updating a file handle migration table with an entry for the location on the source file server and an entry for the location on the destination file server responsive to a successful migration.

25. The computer program product of claim 24, wherein the redirecting the access request further comprises:

looking-up the object in the file migration table; and if the object is located, sending the access request to the location on the destination file server.

26. The computer program product of claim 17, wherein the redirecting the access request further comprises:

looking-up the object in the file migration table; and if the object is not located, sending the access request to the location on the source file server.

27. The computer program product of claim 26, wherein the object access request comprises a file access request including one from the group consisting of a read request and a write request.

28. The computer program product of claim 17, wherein the access request comprises a namespace access request including one from the group consisting of a create request, a delete request, a move request, a copy request, a look-up request and a rename request.

29. The computer program product of claim 17, wherein the NAS file handle comprises one from the group consisting of a NFS (Network File System) file handle and a CIFS (Common Internet File System) file handle.

30. A NAS (Network Attached Storage) switch, comprising:

a file server interface to issue a switch file handle representative of the object responsive to receiving a NAS file handle including a location of the object on a source file server, the switch file handle independent of the location of the object on the source file server;

a migration module to enter the location of the object on the source file server and a location of the object on the destination file server responsive to receiving an indication of successful migration, the migration module also to separately replicate a namespace associated with the object and migrate data associated with the object; and a redirection module, communicatively coupled to the migration module, the redirection module redirecting an object access request to the location on the destination file server responsive to receiving the access request associated with the switch file handle, wherein during migration, the redirection module sends the access request to both the namespace and the replicated namespace.

31. The NAS switch of claim 30, wherein the object comprises a directory having objects representative of sub-directories and files.

32. The NAS switch of claim 30, wherein the object comprises a file.

33. The NAS switch of claim 30, wherein the migrating module replicates a namespace associated with the object, the namespace located on the source file server and the replicated namespace located on the destination file server.

34. The NAS switch of claim 33, wherein prior to migrating the object, the migration module stores a stored file handle in the location on the destination file server, the stored file handle indicative of the location of the object on the source file server.

35. The NAS switch of claim 30, wherein after migrating the object, the migration module stores a stored file handle in the location on the source file server, the stored file handle indicative of the location of the object on the destination file server.

36. The NAS switch of claim 30, wherein the migration module migrates data associated with the object.

37. The NAS switch of claim 30, wherein the migration module updates a file handle migration table with an entry for the location on the source file server and an entry for the location on the destination file server responsive to a successful migration.

38. The NAS switch of claim 37, wherein the redirection module looks-up the object in the file migration table, and sends the object access request to the location on the destination file server responsive to the object being located.

39. The NAS switch of claim 30, wherein the redirection module looks-up the object in the file migration table, and sends the access request to the location on the source file server responsive to the object not being located.

40. The NAS switch of claim 30, wherein the object access request comprises a file access request including one from the group consisting of a read request and a write request.

41. The NAS switch of claim 30, wherein the object access request comprises a name access request including one from the group consisting of a create request, a delete request, a move request, a copy request, a look-up request and a rename request.

42. The NAS switch of claim 30, wherein the NAS file handle comprises one from the group consisting of a NFS (Network File System) file handle and a CIFS (Common Internet File System) file handle.

* * * * *